Sept. 23, 1947.    E. K. CLARK ET AL    2,427,945
ELECTRIC HOTPLATE WITH VESSEL-TEMPERATURE CONTROL
Filed Dec. 5, 1942    3 Sheets-Sheet 1

WITNESSES:

INVENTOR
EARL K. CLARK AND
EDWARD BLETZ.
BY
ATTORNEY

Sept. 23, 1947.   E. K. CLARK ET AL   2,427,945
ELECTRIC HOTPLATE WITH VESSEL-TEMPERATURE CONTROL
Filed Dec. 5, 1942   3 Sheets-Sheet 2

WITNESSES:

INVENTOR
EARL K. CLARK AND
EDWARD BLETZ.
BY
ATTORNEY

Patented Sept. 23, 1947

2,427,945

UNITED STATES PATENT OFFICE 2,427,945

ELECTRIC HOT PLATE WITH VESSEL-TEMPERATURE CONTROL

Earl K. Clark, Mansfield, and Edward Bletz, Lexington, Ohio, assignors to Westinghouse Electric Corporation, East Pittsburgh, Pa., a corporation of Pennsylvania Application December 5, 1942, Serial No. 467,957

9 Claims. (Cl. 219—20)

This invention relates to electric heating devices and particularly to electric cooking ranges and the like having a heating unit provided with a control for regulating the heat output of the unit, and it has for an object to provide an improved device of the character set forth.

In cooking foods that require the addition of water, it is desirable to bring such foods and the water to the boiling point, as rapidly as possible, and then supply sufficient heat to at least maintain the food and water at or near the boiling point so that the liquid will "simmer" until the food is completely cooked. In the copending applications of Edward Bletz, filed on August 14, 1941, and bearing Serial No. 406,781, and issued April 3, 1946, as Patent Number 2,399,423, and of Earl K. Clark, filed on April 14, 1942, and bearing Serial No. 438,887, each assigned to the assignee of the present invention, there are described and claimed control systems for the surface heating units of electric cooking ranges or the like which automatically control the cooking of foods in this manner.

Briefly, the control systems disclosed in the mentioned applications each comprise a switch-actuating thermostat mounted in a position to be responsive to the temperature of the bottom of a cooking vessel placed on the surface heating unit, and a device operating independently of the temperature of the vessel and adjustable to vary the heat output of the surface unit. In these control systems, the thermostat maintains the surface unit on "high" heat or at maximum heat output to rapidly bring the contents of the vessel to the boiling point, after which control of the surface unit is transferred to the device which controls the heat output of the surface unit and is adjusted to provide a sufficient amount of heat to maintain the contents of the vessel at the boiling point. The thermostat disclosed in the mentioned Clark application includes means for compensating for the heat leaking to the thermostat from the surface unit so that the thermostat measures and responds to the cooking vessel temperature regardless of the length of time required to heat the vessel and its contents to the boiling point.

However, in certain cooking operations, for example, when cooking large lumpy vegetables such as potatoes with a relatively small quantity of water, the potatoes do not absorb heat fast enough to prevent the water at the bottom of the vessel from attaining its boiling temperature before the potatoes, with the result that the potatoes may be at a substantially lower temperature at the time the thermostat, which responds to the temperature at the bottom of the vessel, transfers control of the surface unit to the control device. It is desirable, therefore, to maintain the surface unit on "high" heat until the potatoes as well as the liquid contents of the vessel substantially reach the boiling point before decreasing the heat output of the surface unit.

It is, accordingly, a further object of the invention to provide an improved control system of the character set forth, which maintains the surface unit or the like under its control at maximum heat output for a predetermined minimum period when heating a cooking vessel or the like.

The thermostat disclosed in the Clark application employs a main bimetal element primarily responsive to the temperature of the vessel being heated by the surface unit, and a secondary bimetal element coupled with the primary bimetal element to compensate for the heat leaking from the surface unit directly to the primary bimetal element. As the secondary or compensating bimetal heats up, it raises the switch-opening temperature of the primary bimetal and thereby delays the opening of the thermostat switch by the primary bimetal until the contents of the vessel have reached the boiling point. We propose to mechanically advance or deflect the compensating bimetal, in the direction in which it moves on heating up, to raise the switch-opening temperature of the primary bimetal so that the surface unit is maintained on high heat for a selected minimum period of time.

It is a further object of the invention to provide an improved control system of the character set forth employing a compensated thermostat in which the compensating means is prevented from locking the thermostat switch in closed condition.

With a thermostat of this character which employs a compensating bimetal, if the surface unit is heated for long intervals at maximum heat output with the intervals in immediate succession, the continuous heating of the compensating bimetal may deflect it sufficiently to prevent the thermostat switch from opening. For example, if the surface unit is employed to raise the largest quantity of food normally cooked to the boiling piont and immediately thereafter that food is removed and a cold vessel of food placed on the surface unit, the primary bimetal is immediately cooled by the cold vessel and closes the thermostat switch, but the compensating bimetal which is unaffected by the cold vessel continues to be heated and deflects in the direction to maintain the thermostat switch closed, with the result that the switch may remain closed regardless of any temperature attainable by the primary bimetal.

These and other objects are effected by our invention as will be apparent from the following description and claims taken in connection with the accompanying drawings, forming a part of this application, in which:

Figure 1:
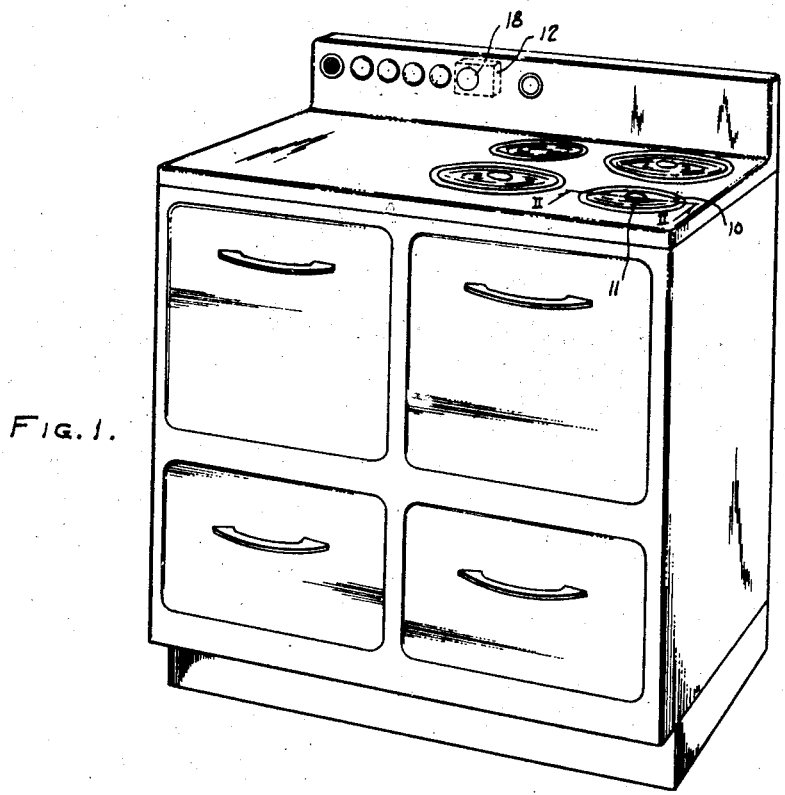
Fig. 1 is a perspective view of an electric cooking range in which the present invention is incorporated.
Figures 7, 8:
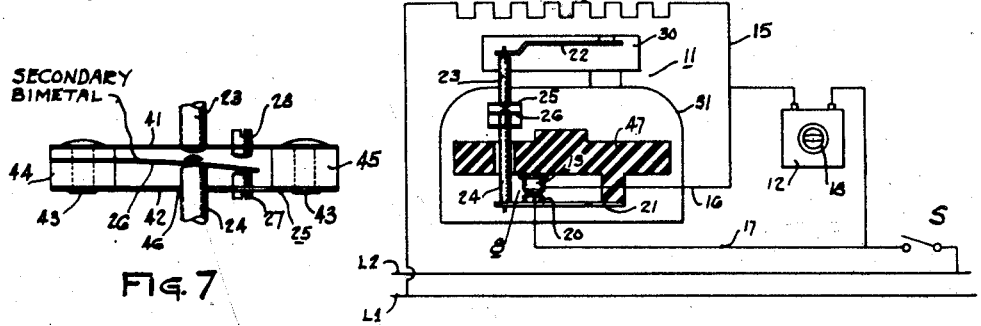
Fig. 7 is a view taken substantially along the line VII—VII of Fig. 4.
Fig. 8 is a schematic wiring diagram of one type of circuit in which the present invention may be employed.
Figure 6:
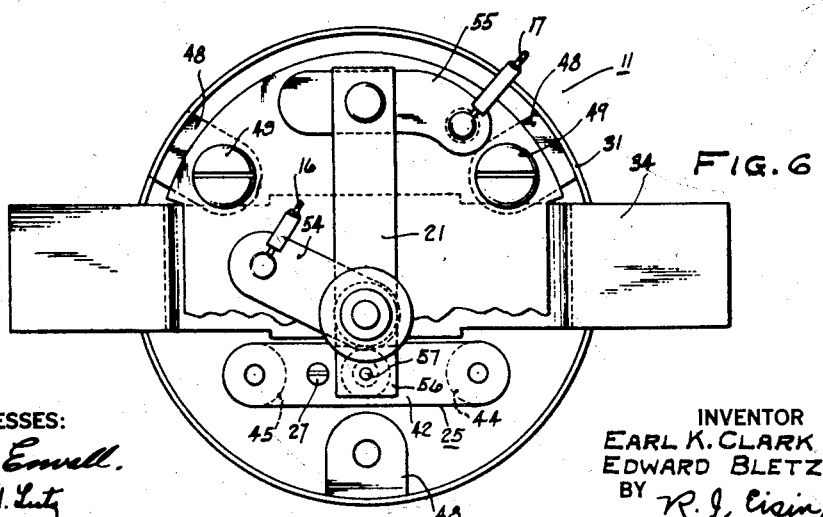
Fig. 6 is a bottom plan view of the thermostat of Fig. 5.

Referring to the drawings and particularly to Fig. 8, there is shown a schematic wiring diagram of a control system for automatically controlling the operation of an electrical heating element, such as one of the surface heating units 10 of the range illustrated in Fig. 1. In this diagram, the surface heating unit 10 is controlled by a thermostat, generally indicated 11, and a wattage control device or the like, indicated diagrammatically by the rectangle 12, which is adjustable to vary the heat output of the surface unit. The thermostat 11 is adapted to be mounted in good heat-receiving relation to a vessel 9, placed on the surface unit 10, and actuates a switch 8. As long as the thermostat is below its switch-opening temperature, the heating element 10 is continuously energized, at its maximum rate, through a circuit traceable from one line conductor $L_1$, through the heating element 10, conductors 15 and 16, closed contacts of the switch 8, conductor 17, closed contacts of a line switch S to the other line conductor $L_2$. When the thermostat reaches its switch-opening temperature, the mentioned circuit is interrupted by the opening of switch 8, and the wattage control device 12, which has been shunted by the closed switch 8, then completes a circuit for the surface unit 10. The wattage control device may be of any preferred type, such as a rheostat or intermittently-operating circuit-interrupting means like that shown in the mentioned Bletz application. The wattage control device may be mounted at the rear of the range backsplasher and is preferably adjustable by knob 18 accessible at the front to provide a predetermined energy input to the surface unit 10 when the switch 8 is open. The knob 18 may also actuate line switch S.

The switch 8 of the thermostat 11 comprises a fixed contact 19 and a movable contact 20 fixed on the free end of a spring arm 21 that biases the movable contact upwardly into engagement with the fixed contact. A main bimetal element 22, which is positioned in a casing 30, to be primarily responsive to the temperature of the cooking vessel, bows downwardly as it heats up and acting through coupled rods 23 and 24 tends to move the spring arm 21 and its contact 20 away from the fixed contact 19. The coupling for the rods 23 and 24 comprises a frame 25 fixed to the lower end of the upper rod 23, the upper end of the lower rod 24 extending freely into the frame and being fixed to a compensating or secondary bimetal element 26 secured at one end in the frame.

The secondary bimetal element 26 is disposed within a lower casing 31 located thermally remote from the cooking vessel and is heated solely by the surface unit. This bimetal is arranged so that it bows upwardly when heated to shorten the effective overall length of the rods 23 and 24. It will be apparent that this shortening of the effective length of the rods increases the deflection required of the main bimetal 22 to open the switch 8, than would be the case if the overall length of the rods were fixed. Consequently, the higher the temperature of the compensating bimetal, the higher the temperature and the greater the deflection required of the main bimetal to open the switch 8. The secondary bimetal is selected so that its deflection upwardly compensates for the heat leaking from the surface unit to the main bimetal.

The main and secondary bimetal elements 22 and 26, respectively, are preferably calibrated so that the downward movement of the main bimetal overcomes the upward bias of the spring arm 21, to open the switch 8, when the bottom of the vessel reaches the boiling point. However, as pointed out above, it is desirable that the switch 8 remain closed for a minimum period of time regardless of the temperature of the bottom of the vessel to permit the nonliquid contents of the vessel to substantially reach the boiling point. For the purpose of this disclosure, it is assumed that the switch 8 is to remain closed to provide maximum or "high" heat to the vessel for at least five minutes. This is accomplished by raising or advancing the secondary bimetal 26 to the position it assumes when it has been heated by the surface unit for five minutes under normal cooking conditions. The secondary bimetal is advanced to this position by means of an adjustable stop 27 carried by the frame 25. It will be understood that by mechanically raising the secondary bimetal in this manner, the main bimetal element does not open the switch 8 until it attains a temperature which corresponds to its switch-opening temperature when the temperature of the secondary bimetal would have raised the latter to the position determined by the setting of the stop 27. Since the compensating bimetal has been advanced to a point corresponding to the temperature of the secondary bimetal at the end of the five minute heat-up period, the main bimetal will not open the switch 8 until a period of approximately five minutes has elapsed.

If the contents of the vessel are such that they do not reach the boiling point by the end of the five minute period, the temperature of the main bimetal will not be high enough to open the switch 8. Consequently, at the end of five minutes the secondary bimetal moves away from the stop 27 to compensate for the heat leaking to the primary bimetal and thereafter the switch 8 opens when the contents of the vessel reach the boiling point.

From the above description, it will be seen that the thermostat switch 8 remains closed for an initial period of approximately five minutes even though the contents of the vessel may have reached the boiling point in a shorter period and that in the period following this initial period of five minutes, the thermostat switch is fully compensated and opens at the time the contents of the vessel reach the boiling point.

It has been mentioned that it is desirable to limit the compensation of the thermostat to prevent the thermostat switch from remaining closed in the event the secondary bimetal is heated for such a long interval as to prevent the main bimetal from opening the switch. This is accomplished by means of a second stop 28 carried by the frame and adjusted so that the upwardly-moving secondary bimetal 26 engages this stop at the end of a cooking period corresponding to the time required to heat the largest quantity of food normally cooked on the surface unit to the boiling point.

Figure 10:
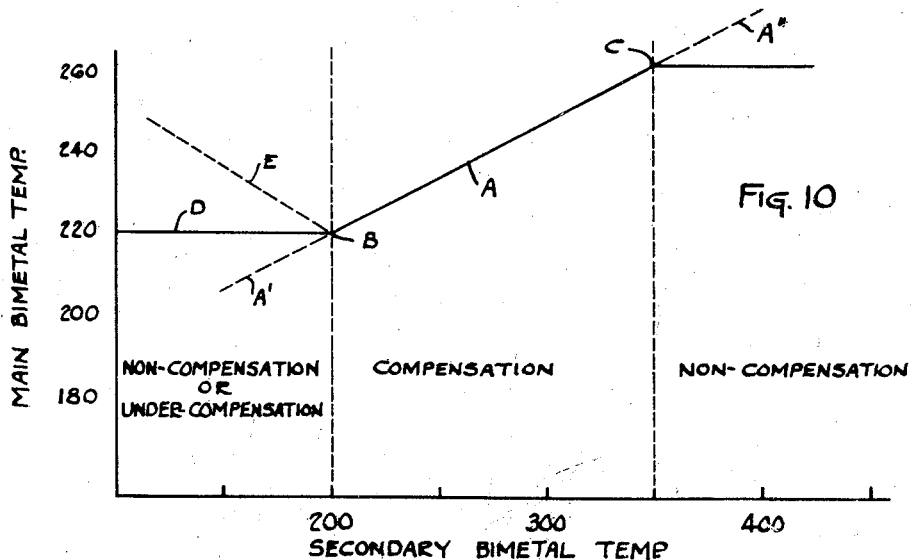

A better understanding of the controlled compensation effected by the secondary bimetal 26 and stops 27 and 28 may be had by reference to Fig. 10 wherein the temperature of the main bimetal 22 is plotted against the temperature of the secondary bimetal.

In this graph, the curve A, including the dotted extensions A' and A'', represents the related temperatures of the primary and secondary bimetals at which the thermostat switch 8 would open, were the thermostat fully compensated throughout its entire range of use. Thus, regardless of the quantity of liquid or the time required to heat the liquid to the boiling point, the thermostat switch 8 would open at the time the liquid reached the boiling point. However, as previously explained, we have found it desirable to maintain the surface unit on high heat for a minimum period, for example, five minutes, and this is accomplished by advancing the position of the secondary bimetal, by means of stop 27, to correspond to the temperature reached by the bimetal when heated for five minutes.

In the graph of Fig. 10, this temperature has been assumed to be 200° F. and it will be noted corresponds to a temperature of 220° F. of the main bimetal. Therefore, as long as the secondary bimetal temperature is below 200° F. and the main bimetal temperature is below 220° F., the thermostat switch 8 does not open even though the liquid in the vessel may have reached the boiling point. As long as the secondary bimetal is below 200° F., the switch 8 opens only when the main bimetal has reached its minimum switch-operating temperature of 220° F., which is represented by the horizontal line D of the graph.

If, however, the temperature of the secondary bimetal exceeds 200° F. before the main bimetal reaches 220° F., the secondary bimetal moves away from the lower stop 27 or, in other words, begins to compensate so that the switch-opening temperature of the main bimetal is raised and the switch 8 remains closed until the temperatures of the main and secondary bimetal correspond to a point on the curve A to the right of its lower limit B. Under this condition, of course, the main bimetal opens the switch 8 at the time the food reaches the boiling point since the secondary bimetal is compensating for heat leaking to the main bimetal from the surface unit.

We have found that the longest period of high heat normally required in the average kitchen to raise food to the boiling point is ten minutes and with the particular unit tested the secondary bimetal reached a temperature of about 350° F. The upper limit C of the curve A of the graph of Fig. 10 corresponds to a temperature of 350° F. in the secondary bimetal and represents the temperature at which the secondary bimetal engages the upper stop 28 to terminate compensation for the heat leaking to the thermostat from the surface unit. It will be understood that stopping the movement of the secondary bimetal when it reaches 350° F. will cause the main bimetal to open the switch 8 whenever its temperature reaches approximately 260° F. Both the upper and lower temperature limits B and C may be varied, as desired, to change the length of the initial heating-up period or the time at which the upward movement of the compensating bimetal is arrested, by selection of the secondary bimetal, and adjustment of the stops 27 and 28.

While the thermostat may take various forms, it is preferably similar to the thermostat disclosed in the mentioned Clark application, the main bimetal being disposed in an upper casing 30 while switch 8 and secondary bi-metal 26 are located in a lower switch casing 31. These casings are secured in spaced relation to thermally isolate them, by means of shouldered studs 32 and spacer sleeves 33.

Figure 2:
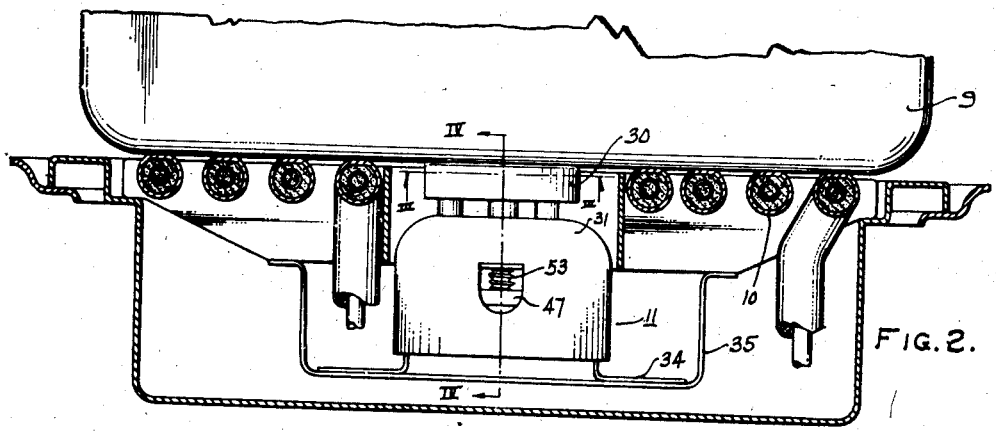
Fig. 2 is a vertical section of one of the surface units of the range in Fig. 1, taken substantially on the line II—II of that figure, and showing a cooking vessel engaging a thermostat mounted in the center of the surface unit.

In order to insure good conduction of heat from the vessel to the main bimetal 22, the thermostat 11 is resiliently mounted in the center of the surface unit, as shown in Figs. 1 and 2, so that the upper casing 30 presses against the bottom of the vessel 9. To this end, an inverted U-shaped bracket 34, fixed to a strap 35 carried by the surface unit 10, is disposed within the lower switch casing 31 and carries a compression spring 36, which engages the under surface of the casing 31 to bias the thermostat upwardly away from the inverted U-shaped bracket 34 but permit the thermostat to be depressed by the vessel, as shown in Fig. 2, relative to the upper surface of the surface unit.

Figure 3:
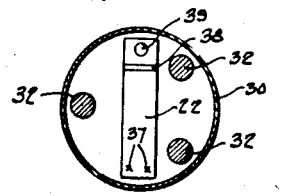
Fig. 3 is a horizontal section taken substantially on the line III—III of Fig. 2.
Figures 4, 5:
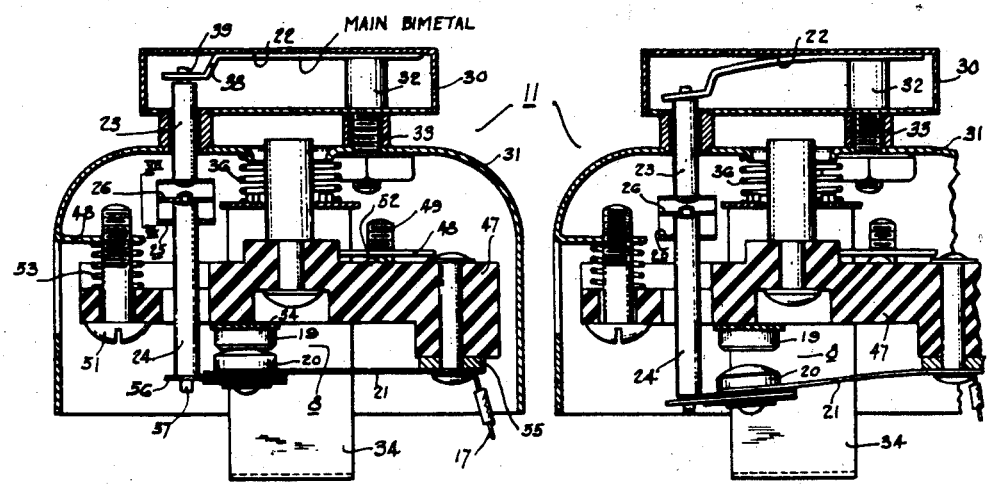
Fig. 4 is a vertical section taken substantially on the line IV—IV of Fig. 2 and showing the thermostat in its cold condition.
Fig. 5 is a view similar to Fig. 4 showing the thermostat in its hot or switch-opening condition.

The main bimetal 22 is secured at one end to the under surface of the top wall of the upper casing 30, as by spot welding, as indicated at 37 (Fig. 3). When the bimetal 22 is cold, that is, at room temperature, it engages throughout a major portion of its length the under surface of the casing 30, as shown in Fig. 4. The free end of the bimetal is formed with a downwardly-offset portion 38 which is provided with an aperture 39 to loosely receive the reduced upper end of the upper rod 23.

The frame or yoke 25 which is fixed to the lower end of the rod 23 comprises upper and lower straps 41 and 42, respectively, connected at their ends by means of rivets 43 and spacers 44 and 45. The lower rod 24 extends freely through an opening 46 in the lower strap 42 and is fixed to the compensating bimetal strip 26. One end of this bimetal strip is fixed between the split spacer 44 with its free end extending between the adjustable stops 27 and 28, which are threaded in the lower and upper straps 42 and 41, respectively.

The switch 8 is mounted on the under surface of a block 47, of insulating material, supported within the lower casing 31 by struck-in horizontal lugs 48 spaced about the side wall of the lower casing. Screws 49 and 51, inserted through suitable openings provided in this block and threaded into the lugs 48, adjustably support the block 47 and the switch 8 carried thereby on the lugs.

In order to facilitate adjustment of the switch 8 relative to the main bimetal 22 in calibrating the thermostat, the upper surface of the block 47, at two of the mentioned screw-receiving openings, is provided with rounded bosses 52 which engage the under surface of their respective lugs 49 to provide fulcrum points. A compression spring 53 is interposed between the remaining lug 48 and the block 47 about the screw 51. When the switch structure has been mounted on the block, and with the bosses 52 drawn fairly snug against their respective lugs 48, the screw 51 is turned to raise or lower the block about the mentioned bosses as fulcrum points to bring the switch 8 into proper relation to the rods 23 and 24 and the main bimetal 22. When this adjustment has been made, a sealing compound or the like may be applied to each of the screws and the adjacent surface of the block or the lugs 48 to fix them in their adjusted position and prevent them from being accidentally displaced.

The fixed contact 19 of the switch 8 is carried by a terminal plate 54 fixed to the under surface of the block 47, conductor 16 being connected to this terminal plate. The spring arm 21 which carries the movable contact 20 is secured to a terminal plate 55, on the block 47, to which conductor 17 is connected.

The free end of the spring arm 21 of the switch assembly insulatedly carries an extension piece 56, which is provided with an opening substantially aligned with the opening 39 in the free end of the main bimetal strip 22 and is of a size to loosely receive the reduced lower end 57 of the rod 24.

Figure 9:
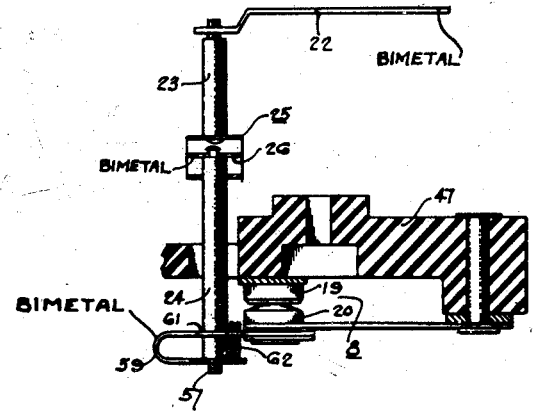
Fig. 9 is a sectional view of a portion of the present thermostat ilustrating a slightly modified form of the invention; and, Fig. 10 is a temperature graph indicating the action of the thermostat of the present invention.

In Fig. 9, there is shown a slightly modified form of the invention which may be employed to effect undercompensation of the thermostat during the initial five minute period of the cooking cycle by further raising the switch-opening temperature of the main bimetal 22. The thermostat may be identical with that shown in the other figures of the drawing except that the extension 56 of the switch 8 is replaced by a hairpin bimetal 59 having an opening 61 in the upper leg through which the lower rod 24 freely passes. A reduced opening in the lower leg of the hairpin bimetal receives the reduced end 57 of the rod 24. An adjustable stop 62 threaded into the upper leg of the bimetal 59 is arranged with its lower end in alignment with the lower leg of the hairpin.

The hairpin bimetal 59 is heated by the surface unit and is arranged so that when heating up tends to close, that is, the free lower leg moves up toward the fixed upper leg. Thus, when the bimetal 59 is cold, the lower leg is spaced from the stop 62 and as the hairpin heats up, it approaches and eventually engages the stop. This movement of the hairpin has the effect of undercompensating the thermostat or, in other words, raising the switch-opening temperature of the main bimetal to retard or delay the opening of the thermostatic switch 8. The stop 62 is preferably adjusted so that the lower leg of the hairpin bimetal engages the stop at about the time the secondary bimetal 26 moves away from its stop 27 and becomes effective to compensate for the heat leaking to the thermostat for the surface unit. The effect of the hairpin bimetal 59 is to shift the line D of the graph to to the position E, this line E representing the switch-closing temperature of the main bimetal when the secondary bimetal and hairpin bimetal temperatures are below the lower limit B.

While we have shown our invention in several forms, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. In an electrically-heated cooking device, the combination of heating means for heating a cooking vessel or the like, means for supplying electrical energy to said heating means, switch means for controlling the supply of electrical energy to said heating means and movable to a first position to provide a continuous supply of electrical energy to said heating means to rapidly heat said vessel and movable to a second position to interrupt said continuous supply of electrical energy to said heating means, first thermostatic means associated with the heating means in a position in which it is responsive to the temperature of the cooking vessel and in which it is subjected to heat leaking from said heating means, said first thermostatic means being operable to maintain said switch means in said first position until the temperature of the cooking vessel has been raised to an approximate predetermined value and subsequently actuate said switch means to said second position, additional thermostatic means spaced from the cooking vessel and the first thermostatic means so as to be substantially thermally isolated therefrom and responsive to heat from the heating means for modifying the action of the first thermostatic means to compensate for heat leaking from said heating means to said first thermostatic means, and means for limiting the modifying action of said additional thermostatic means upon decrease in temperature thereof and thereby preventing said first thermostatic means from actuating said switch to said second position until said first thermostatic means reaches a predetermined temperature irrespective of the temperature of said cooking vessel.

2. The combination set forth in claim 1 wherein said means for limiting the modifying action of said additional thermostatic means comprises a stop adapted to abut and prevent further movement of said additional thermostatic means when its temperature has been lowered to said predetermined temperature.

3. In an electrically-heated cooking device, the combination of heating means for heating a cooking vessel or the like, means for supplying electrical energy to said heating means, switch means for controlling the supply of electrical energy to said heating means and movable to a first position to provide a continuous supply of electrical energy to said heating means and movable to a second position to interrupt said continuous supply of electrical energy to said heating means, first thermostatic means associated with the heating means in a position in which it is responsive to the temperature of the cooking vessel and in which it is subjected to heat leaking from said heating means, said first thermostatic means being operable to maintain said switch means in said first position until the temperature of the cooking vessel has been raised to an approximate predetermined value and subsequently actuate said switch means to said second position, additional thermostatic means spaced from the cooking vessel and the first thermostatic means so as to be substantially thermally isolated therefrom and responsive to heat from the heating means for modifying the action of the first thermostatic means to compensate for heat leaking from said heating means to said first thermostatic means, and means for limiting the modifying action of said additional thermostatic means, upon increase in temperature, to that corresponding to a predetermined temperature thereof which is sufficiently high to provide such modifying action throughout a substantial range of temperature of said additional thermostatic means but which is sufficiently low to minimize danger of the first thermostatic means failing to open the contacts when the temperature of the cooking vessel has been raised to said predetermined value.

4. The combination set forth in claim 3 wherein said limiting means comprises a stop adapted to abut and prevent further movement of said additional thermostatic means when the temperature of the latter has been raised to said predetermined temperature.

5. The combination set forth in claim 1 and further including means for limiting the modifying action of said additional thermostatic means, upon increase in temperature, to that corresponding to a predetermined temperature thereof.

6. A thermostat comprising a first temperature-responsive means, switch means, means connecting said first temperature-responsive means to said switch means for actuating the same, said connecting means including second temperature-responsive means arranged to modify the actuation of said switch means by said first temperature-responsive means, and means limiting the modifying action of said second temperature-responsive means to when the temperature of said second temperature-responsive means is above a predetermined minimum value.

7. A thermostat comprising a first temperature-responsive means, switch means, means connecting said temperature-responsive means to said switch means for actuating the same, said connecting means including second temperature-responsive means arranged to modify the actuation of said switch means by said first temperature-responsive means, and means limiting the modifying action of said second temperature-responsive means to when the temperature of said second temperature-responsive means lies below a predetermined maximum value.

8. A thermostat comprising a first temperature-responsive means, switch means, means connecting said first temperature-responsive means to said switch means for actuating the same, said connecting means including second temperature-responsive means arranged to modify the actuation of said switch means by said first temperature-responsive means, and means limiting the modifying action of said temperature-responsive means to when the temperature of said second temperature-responsive means lie between predetermined minimum and maximum values.

9. A thermostat comprising a first temperature-responsive means, switch means, means connecting said temperature-responsive means to said switch means for actuating the same, said connecting means including second temperature-responsive means movable to modify the actuation of said switch means by said first temperature-responsive means, and stop means limiting the movement of said second temperature-responsive means to restrict the modifying action of said second temperature-responsive means to a predetermined temperature range of said second temperature-responsive means.

EARL K. CLARK.
EDWARD BLETZ.

REFERENCES CITED

The following references are of record in the file of this patent:

UNITED STATES PATENTS

| Number | Name | Date |
|---|---|---|
| 2,140,479 | Myers et al. | Dec. 13, 1938 |
| 2,221,870 | Kahn et al. | Nov. 19, 1940 |
| 2,300,551 | Kahn et al. | Nov. 3, 1942 |
| 2,044,397 | Persons | June 16, 1936 |
| 2,128,807 | Ettinger | Aug. 30, 1938 |
| 2,239,540 | Spencer | Apr. 22, 1941 |
| 2,347,707 | Myers | May 2, 1944 |

---

Certificate of Correction

Patent No. 2,427,945.                               September 23, 1947.

EARL K. CLARK ET AL.

It is hereby certified that error appears in the printed specification of the above numbered patent requiring correction as follows: Column 10, after line 48, add the following reference 1,927,934 Ford _____ Sept. 26, 1933 and that the said Letters Patent should be read with this correction therein that the same may conform to the record of the case in the Patent Office.

Signed and sealed this 2d day of December, A. D. 1947.

[SEAL]

THOMAS F. MURPHY,
*Assistant Commissioner of Patents.*